(12) United States Patent
Huang et al.

(10) Patent No.: US 10,652,916 B2
(45) Date of Patent: May 12, 2020

(54) METHOD, TERMINAL AND SERVER FOR ALLOCATING NARROW BAND INTERNET OF THINGS SYSTEM RESOURCES

(71) Applicant: CLOUDMINDS (SHENZHEN) ROBOTICS SYSTEMS CO., LTD., Shenzhen (CN)

(72) Inventors: William Xiao-Qing Huang, Guangdong (CN); Haitao Jiang, Guangdong (CN); Zhenkai Wang, Guangdong (CN)

(73) Assignee: CLOUDMINDS (SHENZHEN) ROBOTICS SYSTEMS CO., LTD., Guangdong (CN)

( * ) Notice: Subject to any disclaimer, the term of this patent is extended or adjusted under 35 U.S.C. 154(b) by 0 days.

(21) Appl. No.: 16/347,095

(22) PCT Filed: Sep. 6, 2016

(86) PCT No.: PCT/CN2016/098249
§ 371 (c)(1),
(2) Date: May 2, 2019

(87) PCT Pub. No.: WO2018/045494
PCT Pub. Date: Mar. 15, 2018

(65) Prior Publication Data
US 2019/0274150 A1   Sep. 5, 2019

(51) Int. Cl.
*H04W 72/12* (2009.01)
*H04W 28/20* (2009.01)
(Continued)

(52) U.S. Cl.
CPC ......... *H04W 72/1236* (2013.01); *H04W 4/00* (2013.01); *H04W 28/20* (2013.01);
(Continued)

(58) Field of Classification Search
None
See application file for complete search history.

(56) References Cited

U.S. PATENT DOCUMENTS

| 9,232,498 B2 | 1/2016 | Mohanty | |
|---|---|---|---|
| 2016/0174234 A1* | 6/2016 | Wang | H04B 17/24 370/329 |

FOREIGN PATENT DOCUMENTS

| CN | 101217497 A | 7/2008 |
|---|---|---|
| CN | 101827061 A | 9/2010 |

(Continued)

*Primary Examiner* — Ayaz R Sheikh
*Assistant Examiner* — Sori A Aga (57) ABSTRACT

Embodiments of the present application belong to the field of NB-IoT, and relate to a method, terminal and server for allocating NB-IoT system resources, capable of satisfying the requirements of traffic rate and communication quality simultaneously. The method comprises the following steps of: acquiring a traffic request of a first terminal; determining bearing carriers and the number of the bearing carriers required for bearing downlink data of the first terminal based on candidate carriers information and downlink traffic rate requirement; determining target downlink transmitting power of each of the bearing carriers based on the reception quality information, the determined bearing carriers, the determined number of the bearing carriers and the reception strength information; and determining to transmit the downlink data of the first terminal on an i-th bearing carrier using the determined target downlink transmitting power if a total downlink transmitting power of the i-th bearing carrier is less than or equal to a first preset threshold.

9 Claims, 4 Drawing Sheets

(51) Int. Cl.
*H04W 28/22* (2009.01)
*H04W 28/24* (2009.01)
*H04W 52/26* (2009.01)
*H04W 72/04* (2009.01)
*H04W 4/00* (2018.01)

(52) U.S. Cl.
CPC ........... *H04W 28/22* (2013.01); *H04W 28/24* (2013.01); *H04W 52/265* (2013.01); *H04W 72/04* (2013.01)

(56) References Cited

FOREIGN PATENT DOCUMENTS

| | | |
|---|---|---|
| CN | 102638866 A | 8/2012 |
| CN | 103188685 A | 7/2013 |
| CN | 104581963 A | 4/2015 |
| CN | 104640217 A | 5/2015 |
| CN | 104937966 A | 9/2015 |

\* cited by examiner

METHOD, TERMINAL AND SERVER FOR ALLOCATING NARROW BAND INTERNET OF THINGS SYSTEM RESOURCES

CROSS-REFERENCE TO RELATED APPLICATION

This application claims the benefit of PCT application No. PCT/CN2016/098249 filed on Sep. 6, 2016, the contents of which are incorporated herein by reference.

FIELD OF THE INVENTION

The present application relates to a field of Narrow Band Internet of Things (NB-IoT), and specifically relates to a method, terminal and server for allocating NB-IoT system resources.

BACKGROUND OF THE INVENTION

NB-IoT is an important technical means for operators and communication equipment suppliers to get into the Internet of Vehicles, Wise Information Technology of 120 (WIT120), Smart Home, robot and other emerging Internet of Things fields. However, so far there has no effective technology to satisfy the requirements of traffic rate and communication quality simultaneously.

SUMMARY OF THE INVENTION

The present application provides a method, terminal and server for allocating NB-IoT system resources, capable of satisfying the requirements of traffic rate and communication quality simultaneously.

According to an aspect of the embodiments of the present application, a method for allocating NB-IoT system resources is provided, and the method comprises the following steps of:

acquiring a traffic request of a first terminal, wherein the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information;

determining bearing carriers and the number of the bearing carriers N required for bearing downlink data of the first terminal based on candidate carriers information and the downlink traffic rate requirement, wherein N≥1, determining target downlink transmitting power of each of the bearing carriers based on the reception quality information, the determined bearing carriers, the determined number of the bearing carriers and the reception strength information; and determining to transmit the downlink data of the first terminal on an i-th bearing carrier using the determined target downlink transmitting power if a total downlink transmitting power of the i-th bearing carrier is less than or equal to a first preset threshold.

According to another aspect of the embodiments of the present application, a terminal for allocating NB-IoT system resources is provided, and the terminal comprises:

a sending module, configured for sending a traffic request, wherein the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information; and a receiving module, configured for receiving a traffic response to the traffic request.

According to a further aspect of the embodiments of the present application, a server for allocating NB-IoT system resources is provided, and the server comprises:

a traffic request acquiring module, configured for acquiring a traffic request of the first terminal, wherein the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information;

a bearing carrier determining module, configured for determining bearing carriers and the number of the bearing carriers N required for bearing downlink data of the first terminal based on candidate carriers information and the downlink traffic rate requirement, wherein N≥1, a downlink transmitting power determining module, configured for determining target downlink transmitting power of each of the bearing carriers based on the reception quality information, the determined bearing carriers, the determined number of the bearing carriers and the reception strength information; and a processing module, configured for determining to transmit the downlink data of the first terminal on an i-th bearing carrier using the determined target downlink transmitting power if a total downlink transmitting power of the i-th bearing carrier is less than or equal to the first preset threshold.

By the technical solution mentioned above, according to the embodiments of the present application, after acquiring the traffic request of the first terminal, the bearing carriers and the number of the bearing carriers N required for bearing downlink data of the first terminal are firstly determined based on candidate carriers information and the downlink traffic rate requirement, which satisfies the requirement of the downlink traffic rate, and then, after determining the target downlink transmitting power of each of the bearing carriers, it is determined to transmit the downlink data of the first terminal on an i-th bearing carrier using the determined target downlink transmitting power if the total downlink transmitting power of the i-th bearing carrier is less than or equal to the first preset threshold, which satisfies the requirements of service coverage and communication quality; therefore, it may ensure the traffic rate and the communication quality simultaneously.

Other features and advantages of the embodiments of the present application will be partially described specifically in the following Detailed Description of the Preferred Embodiments.

DESCRIPTION OF THE DRAWINGS

The drawings serve to provide a further understanding of the embodiments of the present application, constitute a part of this specification and to explain the embodiments of the present application together with the following preferred implementation, but are not to be construed to limit the embodiments of the present application. In the drawings.

DETAILED DESCRIPTION OF THE EMBODIMENTS

Hereinafter, preferred embodiments of the present application are explained with reference to the drawings. It should be understood that the preferred implementations described herein are used only to describe and explain the embodiments of the present application, rather than limit them.

Before describing the method, terminal and server for allocating NB-IoT system resources according to the embodiments of the present application in detail, the application scenario of the embodiments of the present application is introduced firstly.

NB-IoT usually consists of terminals and serving base stations. With the daily increase of cost and complexity of the terminals to be controlled in the fields of emerging Internet of Things such as the Internet of Vehicles, WIT120 and Smart Home, it is necessary to introduce a cloud robot server in the NB-IoT, so that simple processing functions are arranged on the local terminals to be controlled, complex intelligent processing and operation functions are arranged on the cloud robot server and distributed to the to-be-controlled terminals via Internet as required. Based on such demand, the inventor of the present application proposes a method, terminal and server for allocating NB-IoT system resources according to the embodiments of the present application.

Figure 1:
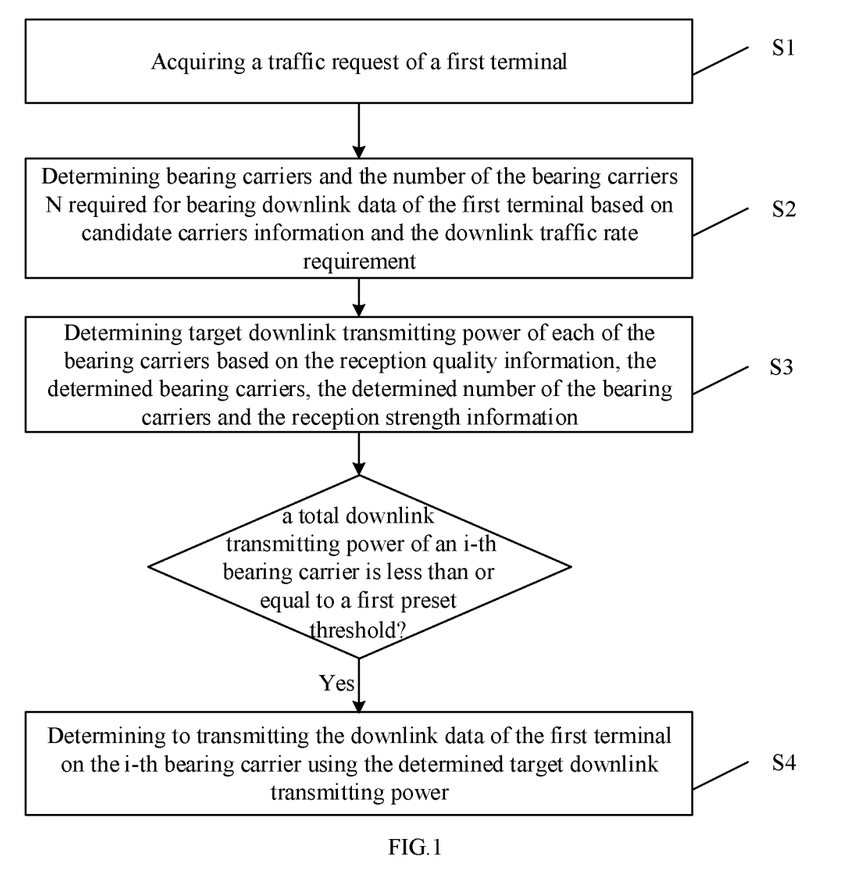
FIG. 1 is a flowchart of a method for allocating NB-IoT system resources according to an embodiment of the present application.

A method for allocating NB-IoT system resources according to the embodiments of the present application is provided, as shown in FIG. 1, the method comprises the following steps S1 to S4.

In step S1, a traffic request of a first terminal is acquired, and the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information.

Wherein, the traffic request may firstly be sent to the serving base station of the NB-IoT by the first terminal, and then be reported to the cloud robot server by the serving base station via a dedicated control signaling or a NAS signalling, for example, the traffic request of the first terminal may be reported by the serving base station via a specific known sequence (e.g., 000111000) and transmitting power. Thus the traffic request of the first terminal is acquired by the cloud robot server. It should be understood by those skilled in the art that the known sequence 000111000 herein is only an example, and the known sequence varies from actual traffic requests.

In step S2, bearing carriers and the number of the bearing carriers N required for bearing downlink data of the first terminal are determined based on candidate carriers information and the downlink traffic rate requirement, wherein N≥1.

In the embodiments of the method according to the present application, the candidate carriers may refer to all carriers that provide bearing service for terminals in the serving base station. The candidate carriers information may comprise single-carrier bearing maximum supportable downlink transmitting rate and current load information of each of the candidate carriers. For example, 15 kHz bandwidth is currently used for the downlink transmission of the NB-IoT and the downlink rate is about 250 kbps, then the single-carrier bearing maximum supportable downlink transmitting rate of each of the candidate carriers is 250 kbps.

The step S2 is illustrated hereafter.

It is assumed that the downlink traffic rate requirement included in the traffic request of the first terminal is 500 kbps, and there are four candidate carriers in total, namely, candidate carriers 1, 2, 3 and 4, moreover the single-carrier bearing maximum supportable downlink transmitting rate of these four candidate carriers is 250 kbps, and the current load of the candidate carriers 1, 2, 3 and 4 is respectively 50%, 10%, 20% and 80%, that is to say, the current available maximum downlink traffic rate is respectively 125 kbps, 225 kbps, 200 kbps and 50 kbps, therefore, it may be determined that the number of the bearing carriers required for bearing downlink data of the first terminal is 3 and the specific bearing carriers are the candidate carriers 1, 2 and 3; certainly, it is also feasible that the number of the bearing carriers is 4 and the specific bearing carriers are the candidate carriers 1, 2, 3 and 4. But in order to reduce power consumption and processing complexity of the first terminal, the final determined number of the bearing carriers N is the minimum number in the number of the bearing carriers capable of satisfying the downlink traffic rate requirement; for the example above, the final determined number of the bearing carriers N is 3 instead of 4, this is because, in the case of the same downlink traffic rate requirement, the lower the number of the bearing carriers, the lower the power consumption and processing complexity of the first terminal.

In step S3, based on the reception quality information, the determined bearing carriers, the determined number of the bearing carriers and the reception strength information, the target downlink transmitting power of each of the bearing carriers is determined; and In step S4, it is determined to transmit the downlink data of the first terminal on an i-th bearing carrier using the determined target downlink transmitting power if a total downlink transmitting power Psum-TX-i of the i-th bearing carrier is less than or equal to the first preset threshold.

The total downlink transmitting power Psum-TX-i of the i-th bearing carrier refers to the sum of the downlinks transmitting power of all terminals (including the first terminal) beared on the i-th bearing carrier. The first preset threshold may be set as the single-carrier rated transmitting power of the serving base station, certainly, it is also feasible that the first preset threshold is lower than the single-carrier rated transmitting power of the serving base station.

Furthermore, in step S4, a traffic request acceptance message may be sent as well, so that the first terminal knows that its traffic request has been accepted. For example, a traffic request acceptance message may be sent to the serving base station by the cloud robot server, and then be forwarded to the first terminal by the serving base station.

By the technical solution mentioned above, according to the method of the embodiments of the present application, after acquiring the traffic request of the first terminal, the bearing carriers and the number of the bearing carriers N required for bearing downlink data of the first terminal are firstly determined based on candidate carriers information and the downlink traffic rate requirement, which satisfies the requirement of the downlink traffic rate, and then, after determining the target downlink transmitting power of each of the bearing carriers, it is determined to transmit the downlink data of the first terminal on the i-th bearing carrier using the determined target downlink transmitting power if the total downlink transmitting power Psum-TX-i of the i-th bearing carrier is less than or equal to the first preset threshold (it shows that the coverage of the downlink services of the first terminal is unrestricted), which satisfies the requirements of service coverage and communication quality; therefore, it may ensure the traffic rate and the communication quality simultaneously.

Figure 2:
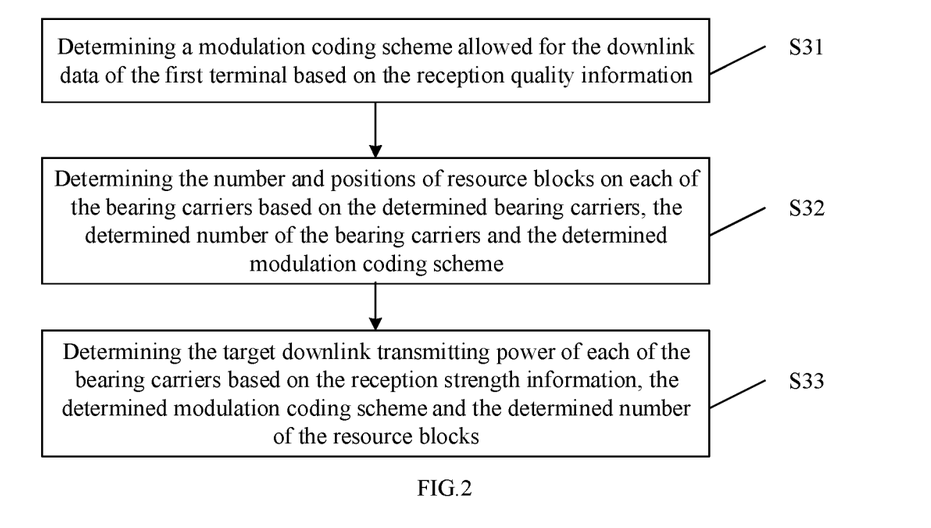
FIG. 2 is flowchart of a method for allocating NB-IoT system resources according to another embodiment of the present application.

According to another aspect of the method according to the embodiments of the present application, as shown in FIG. 2, in step S3, the process of determining the target downlink transmitting power of each of the bearing carriers based on the reception quality information, the determined bearing carriers, the determined number of the bearing carriers and the reception strength information may comprise the following steps S31 to S33.

In step S31, a modulation coding scheme allowed for downlink data of the first terminal is determined based on the reception quality information, e.g., an allowed highest modulation coding scheme. For example, assuming that the reception quality information included in the traffic request of the first terminal is reception quality SINRRS of a reference signal of the serving base station and SINRRS=20 dB, it may be determined that a highest 64 QAM ¾ modulation coding scheme may be adopted.

In step S32, the number and positions of the resource blocks on each of the bearing carriers are determined based on the determined bearing carriers (e.g., load conditions of each bearing carrier), the determined number of the bearing carriers and the determined modulation coding scheme (e.g., the highest modulation coding scheme).

In step S33, the target downlink transmitting power of each of the bearing carriers is determined based on the reception strength information, the determined modulation coding scheme and the determined number of the resource blocks.

By steps S31 to S33, the target downlink transmitting power of each of the bearing carriers may be determined effectively.

Figure 3:
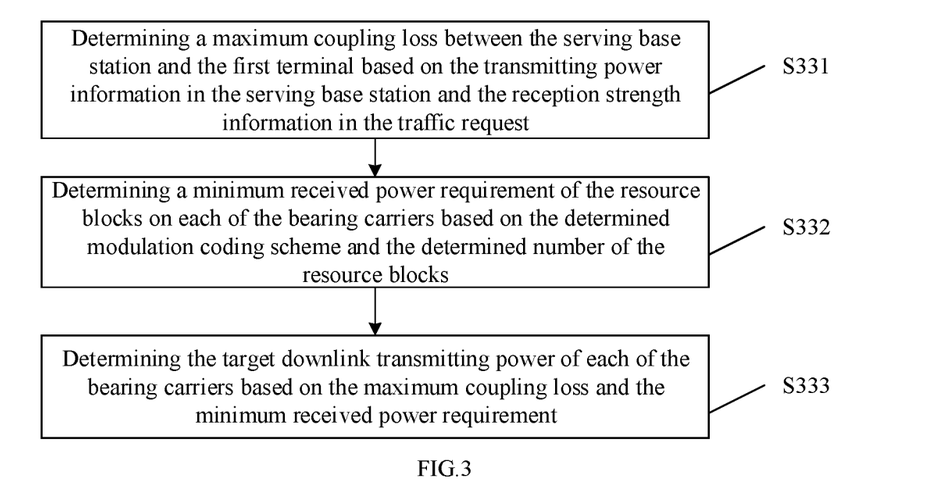
FIG. 3 is flowchart of a method for allocating NB-IoT system resources according to another embodiment of the present application.

According to a further aspect of the embodiments of the present application, as shown in FIG. 3, the step S33 may comprise the following steps S331 to S333.

In step S331, a maximum coupling loss between the serving base station and the first terminal is determined based on the transmitting power information in the serving base station and the reception strength information in the traffic request, wherein the transmitting power information includes one or more of the transmitting power of the primary synchronization signal, the transmitting power of the secondary synchronization signal and the transmitting power of the reference signal in the serving base station.

For example, assuming that the reception strength information included in the traffic request of the first terminal is the reception strength of the primary synchronization signal of the serving base station, namely, the reception strength of the first terminal to the primary synchronization signal of the serving base station (namely, a power value), then the cloud robot server may firstly acquire the transmitting power of the primary synchronization signal of the serving base station from the serving base station, and then may subtract the reception strength of the primary synchronization signal included in the traffic request of the first terminal from the transmitting power of the primary synchronization signal acquired from the serving base station, thus obtaining the maximum coupling loss between the serving base station and the first terminal, wherein the maximum coupling loss comprises transmitting antenna gain of the serving base station.

For another example, assuming that the reception strength information included in the traffic request of the first terminal is the reception strength of the secondary synchronization signal of the serving base station, namely, the reception strength of the first terminal to the secondary synchronization signal of the serving base station (namely, a power value), then the cloud robot server may firstly acquire the transmitting power of the secondary synchronization signal of the serving base station from the serving base station, and then may subtract the reception strength of the secondary synchronization signal included in the traffic request of the first terminal from the transmitting power of the secondary synchronization signal acquired from the serving base station, thus obtaining the maximum coupling loss between the serving base station and the first terminal, wherein the maximum coupling loss comprises transmitting antenna gain of the serving base station.

For another example, assuming that the reception strength information included in the traffic request of the first terminal is the reception strength of the reference signal of the serving base station, namely, the reception strength PR-RS of the first terminal to the reference signal of the serving base station, then the cloud robot server may firstly acquire the transmitting power PT-RS of the reference signal of the serving base station from the serving base station, and then may subtract the reception strength PR-RS of the reference signal included in the traffic request of the first terminal from the transmitting power PT-RS of the reference signal acquired from the serving base station, thus obtaining the maximum coupling loss between the serving base station and the first terminal, wherein the maximum coupling loss comprises transmitting antenna gain of the serving base station.

In step S332, a minimum received power requirement of the resource blocks on each of the bearing carriers is determined based on the determined modulation coding scheme and the determined number of the resource blocks.

Taking the bearing carrier i as an example, the minimum received power requirement PRX-MIN-i may be determined by the following formula:

$$PRX\text{-}MIN\text{-}i=SINRMIN\text{-}i*(Ii+Ni)$$

Wherein SINRMIN-i is a demodulation SNR (Signal to Noise Ratio) required by the modulation coding scheme corresponding to the resource blocks on the bearing carrier i, Ni is thermal noise power of the resource blocks on the bearing carrier i, and Ii is downlink interference power strength of the bearing carrier i.

In step S333, the target downlink transmitting power of each of the bearing carriers is determined based on the maximum coupling loss and the minimum received power requirement.

Again taking the bearing carrier i as an example, the target downlink transmitting power PTX-i may be obtained by the following formula:

$$PTX\text{-}I=PRX\text{-}MIN\text{-}I+\text{maximum coupling loss}$$

Figure 4:
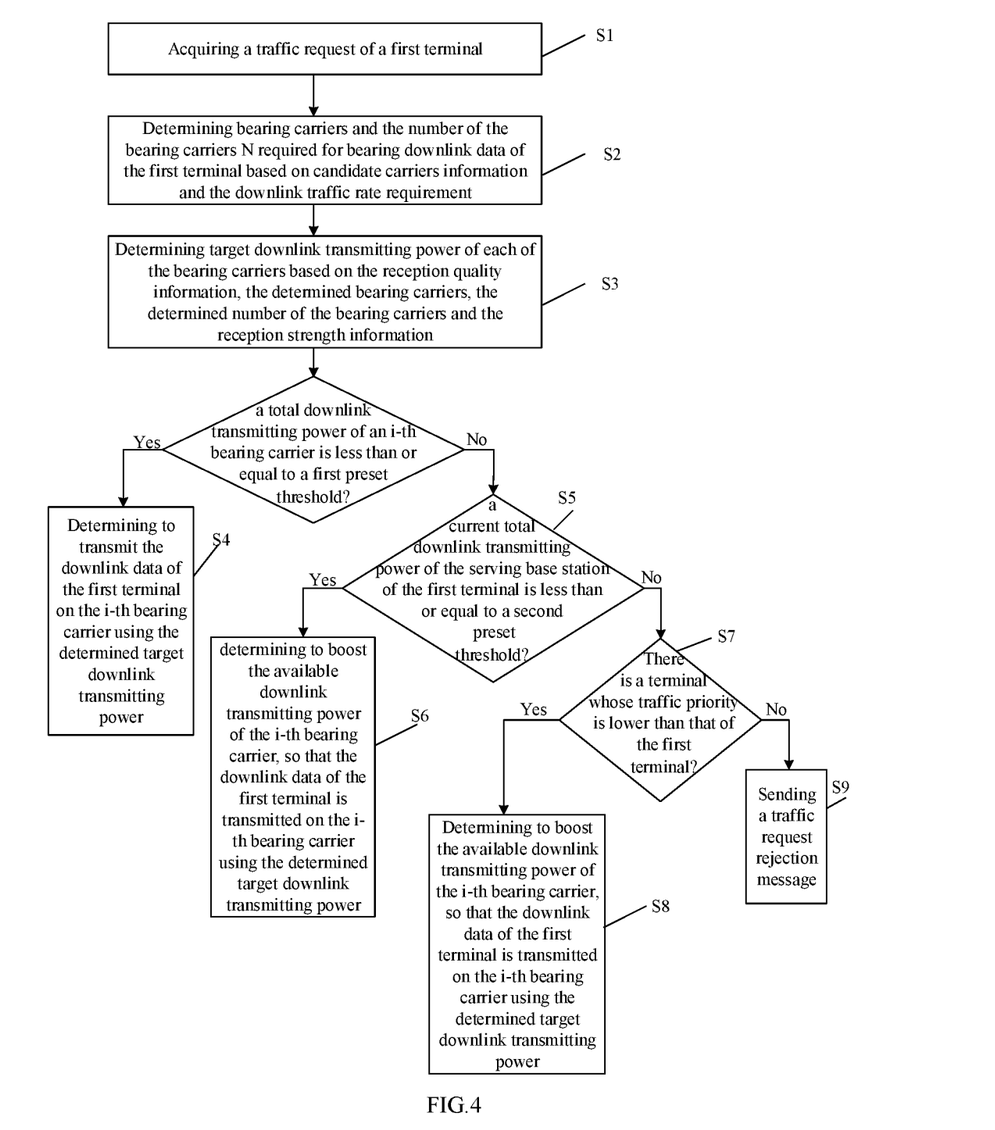
FIG. 4 is flowchart of a method for allocating NB-IoT system resources according to a further embodiment of the present application.

According to a further aspect of the method according to the embodiments of the present application, as shown in FIG. 4, if the total downlink transmitting power Psum-TX-i of the i-th bearing carrier is higher than the first preset threshold, it indicates that the coverage of the downlink traffics of the first terminal is restricted, therefore, in this case, the method further comprises the following steps S5 and S6.

In step S5, it is judged whether the current total downlink transmitting power of the serving base station of the first terminal is less than or equal to a second preset threshold.

The current total downlink transmitting power of the serving base station of the first terminal refers to the total downlink transmitting power of all carriers supported by the serving base station at current scheduling time, namely, a sum of the target downlink transmitting power of coverage-restricted terminals and the current downlink transmitting power of coverage-unrestricted terminals. The cloud robot server may acquire the sum of the current downlink transmitting power from a power controller of the serving base station, for example, a total power request information may be sent by the cloud robot server to the serving base station, and then the information of the sum of the current downlink transmitting power is fed back to the cloud robot server by the serving base station.

The second preset threshold may be set as the maximum of the supportable total transmitting power on all carriers supported by the serving base station. Certainly, it is feasible that the second preset threshold is lower than the maximum of the supportable total transmitting power. The maximum of the supportable total transmitting power may be completely acquired by the cloud robot server from the power controller of the serving base station, for example, a total power request information may be sent by the cloud robot server to the serving base station, and then the information on the maximum of the supportable total transmitting power is fed back to the cloud robot server by the serving base station.

In step S6, if the current total downlink transmitting power of the serving base station of the first terminal is less than or equal to the second preset threshold, it indicates that the available downlink transmitting power of the bearing carrier i of the first terminal may be boosted; therefore, in this step, it is determinate to boost the available downlink transmitting power of the i-th bearing carrier, so that the downlink data of the first terminal is transmitted on the i-th bearing carrier using the determined target downlink transmitting power PTX-i. In this way, the downlink data of the first terminal may be transmitted on the i-th bearing carrier using the determined target downlink transmitting power PTX-i, which satisfies the demand for the downlink traffic coverage of the first terminal.

According to a further aspect of the method according to the embodiments of the present application, as shown in FIG. 4, the method may further comprise the following steps S7 to S8.

In step S7, it is judged whether there is a terminal in the terminals served by the serving base station whose traffic priority is lower than that of the first terminal.

For example, in this step, the cloud robot server may firstly acquire, from the serving base station, the traffic types or traffic priorities of all terminals served by the serving base station at the current scheduling time, and then may judge whether there is a terminal whose traffic type or traffic priority is lower than that of the first terminal.

In step S8, if there is a terminal whose traffic type or traffic priority is lower than that of the first terminal, it is determined to boost the available downlink transmitting power of the i-th bearing carrier, so that the downlink data of the first terminal is transmitted on the i-th bearing carrier using the determined target downlink transmitting power PTX-i. In this way, the downlink data of the first terminal may be transmitted on the i-th bearing carrier using the determined target downlink transmitting power PTX-i, which satisfies the demand for the downlink traffic coverage of the first terminal.

Furthermore, in step S8, it may be determined by the cloud robot server to drop the downlink transmitting power of a terminal with lower traffic type or traffic priority or to not schedule the downlink data of the terminal with lower traffic type or traffic priority at the current scheduling time, and furthermore to boost the downlink transmitting power of the i-th bearing carrier of the first terminal to the determined target downlink transmitting power PTX-i as well as to send a traffic request acceptance message; for example, the cloud robot server may forward the traffic request acceptance message to the first terminal via the serving base station or directly send the traffic request acceptance message to the first terminal.

According to a further aspect of the method according to the embodiments of the present application, as shown in FIG. 4, if it is determined in step S7 that there are no terminals whose traffic priority is lower than that of the first terminal in the terminals served by the serving base station, the method further comprises:

In step S9, a traffic request rejection message is sent. For example, the cloud robot server may forward a traffic request rejection message to the first terminal via the serving base station or directly send a traffic request rejection message to the first terminal.

Therefore, by applying the method according to the embodiments of the present application, in case that the power of the i-th bearing carrier is restricted, dynamic power allocation may be conducted for the downlink transmitting power of the terminals served by the serving base station based on the current total downlink transmitting power of the serving base station, traffic types or traffic priorities of all terminals, etc., so as to preferentially guarantee the downlink data transmission of the terminals whose coverage is restricted but traffic priority is higher, thus effectively ensuring the traffic quality and rate.

Figure 5:
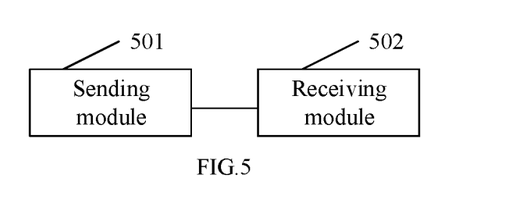
FIG. 5 is a schematic block diagram of a terminal for allocating NB-IoT system resources according to an embodiment of the present application.

A terminal for allocating NB-IoT system resources is further provided according to the embodiments of the present application, as shown in FIG. 5, the terminal may comprise:

a sending module 501, configured for sending a traffic request, wherein the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information; and a receiving module 502, configured for receiving a traffic response to the traffic request. For example, the traffic response may indicate that the traffic request is accepted or rejected.

Figure 6:
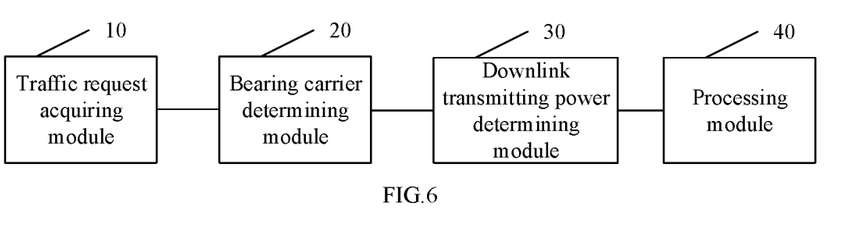
FIG. 6 is a schematic block diagram of a server for allocating NB-IoT system resources according to an embodiment of the present application.

A server for allocating NB-IoT system resources is further provided according to the embodiments of the present application, as shown in FIG. 6, the server may comprise a traffic request acquiring module 10, a bearing carrier determining module 20, a downlink transmitting power determining module 30 and a processing module 40. These modules are described hereafter in detail.

The traffic request acquiring module 10 is configured for acquiring a traffic request of the first terminal, wherein the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information.

The bearing carrier determining module 20 is configured for determining bearing carriers and the number of the bearing carriers N required for bearing downlink data of the first terminal based on candidate carriers information and the downlink traffic rate requirement, wherein N≥1. The candidate carriers information may comprise single-carrier bearing maximum supportable downlink transmitting rate and current load information of each of the candidate carriers. The above content has been specifically described in combination with the method according to the embodiments of the present application, and thus is not repeated in detail herein.

The downlink transmitting power determining module 30 is configured for determining target downlink transmitting power of each of the bearing carriers based on the reception quality information, the determined bearing carriers, the determined number of the bearing carriers and the reception strength information; and the processing module 40 is configured for determining to transmit the downlink data of the first terminal on an i-th bearing carrier using the determined target downlink transmitting power if the total downlink transmitting power of the i-th bearing carrier is less than or equal to the first preset threshold.

Figure 7:
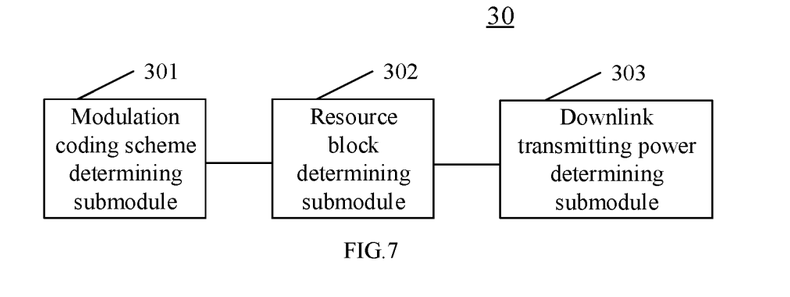
FIG. 7 is a schematic block diagram of a server for allocating NB-IoT system resources according to another embodiment of the present application.

According to a further aspect of the server according to the embodiments of the present application, as shown in FIG. 7, the downlink transmitting power determining module 30 may comprise:

a modulation coding scheme determining submodule 301, configured for determining a modulation coding scheme allowed for the downlink data of the first terminal based on the reception quality information;

a resource block determining submodule 302, configured for determining the number and positions of the resource blocks on each of the bearing carriers based on the determined bearing carriers, the determined number of the bearing carriers and the determined modulation coding scheme;

a downlink transmitting power determining submodule 303, configured for determining the target downlink transmitting power of each of the bearing carriers based on the reception strength information, the determined modulation coding scheme and the determined number of the resource blocks.

Figure 8:
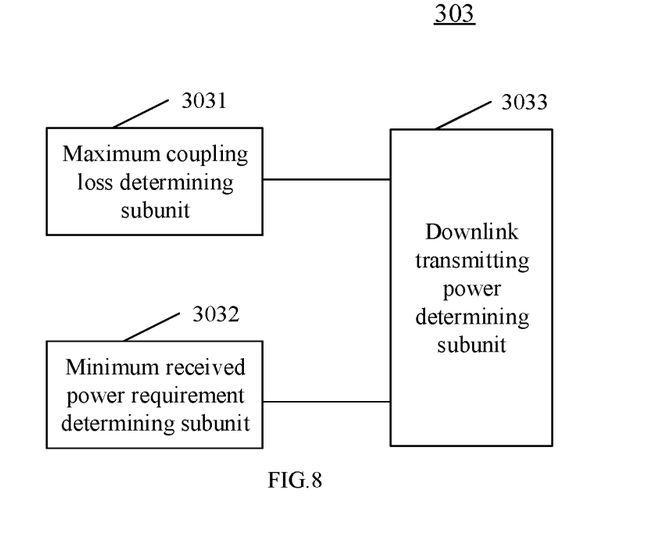
FIG. 8 is a schematic block diagram of a server for allocating NB-IoT system resources according to a further embodiment of the present application.

According to a further aspect of the server according to the embodiments of the present application, as shown in FIG. 8, the downlink transmitting power determining submodule 303 may comprise:

a maximum coupling loss determining subunit 3031, configured for determining a maximum coupling loss between the serving base station and the first terminal based on the transmitting power information in the serving base station and the reception strength information in the traffic request, wherein the transmitting power information includes one or more of the transmitting power of the primary synchronization signal, the transmitting power of the secondary synchronization signal and the transmitting power of the reference signal in the serving base station;

a minimum received power requirement determining subunit 3032, configured for determining a minimum received power requirement of the resource blocks on each of the bearing carriers based on the determined modulation coding scheme and the determined number of the resource blocks; and a downlink transmitting power determining subunit 3033, configured for determining the target downlink transmitting power of each of the bearing carriers based on the maximum coupling loss and the minimum received power requirement.

According to a further aspect of the server according to the embodiments of the present application, the processing module 40 may be further configured for determining to boost the available downlink transmitting power of the i-th bearing carrier if the total downlink transmitting power of the i-th bearing carrier is higher than the first preset threshold and the current total downlink transmitting power of the serving base station of the first terminal is less than or equal to a second preset threshold, so that the downlink data of the first terminal is transmitted on the i-th bearing carrier using the determined target downlink transmitting power.

According to a further aspect of the server according to the embodiments of the present application, the processing module 40 may be further configured for determining to boost the available downlink transmitting power of the i-th bearing carrier if the total downlink transmitting power of the i-th bearing carrier is higher than the first preset threshold, the current total downlink transmitting power of the serving base station is higher than the second preset threshold and there is a terminal whose traffic priority is lower than that of the first terminal in the terminals served by the serving base station, so that the downlink data of the first terminal is transmitted on the i-th bearing carrier using the determined target downlink transmitting power. Furthermore, in this case, the processing module 40 is further configured for determining to drop the downlink transmitting power of a terminal whose traffic priority is lower than that of the first terminal or to not schedule the downlink data of that terminal at the current scheduling time.

According to a further aspect of the server according to the embodiments of the present application, the processing module 40 may be further configured for sending a traffic request rejection message if the total downlink transmitting power of the i-th bearing carrier is higher than the first preset threshold, the current total downlink transmitting power of the serving base station is higher than the second preset threshold and there is no terminal whose traffic priority is lower than that of the first terminal in the terminals served by the serving base station.

The server according to the embodiments of the present application may be a cloud robot server. Specific implementations of the operations executed by the modules in the server according to the embodiments of the present application have been described in detail in the method according to the present application, and thus are not repeated in detail herein.

Preferred embodiments of the present application have been described specifically in combination with the drawings, but the present application is not limited to specific details of the embodiments above; various simple variations may be made to the technical solutions of the present application within the scope of the technical idea of the present application, and these simple variations belong to the protection scope of the present application.

Moreover, it should be noted that the particular technical features described in the preferred embodiments above may be combined in any suitable manner in a case of no contradiction. To avoid unnecessary repetition, any possible combination is not specified separately in the present application any more.

In addition, different embodiments of the present application may be combined in any manner, and any combination should be regarded as the content of the present application within the spirit of the present application.

The invention claimed is:

1. A method for allocating NB-IoT system resources, wherein the method comprises the following steps of:
    acquiring a traffic request of a first terminal, wherein the traffic request includes: (1) downlink traffic rate requirement; (2) reception strength information, wherein the reception strength information includes one or more of a reception strength of a primary synchronization signal, a reception strength of a secondary synchronization signal and a reception strength of a reference signal in a serving base station of the first terminal; (3) reception quality information, wherein the reception quality information includes one or more of a reception quality of the primary synchronization signal, a reception quality of the secondary synchronization signal and a reception quality of the reference signal in the serving base station; and (4) traffic priority identifier information;
    determining bearing carriers and the number of the bearing carriers required for bearing downlink data of the first terminal N based on candidate carriers information and the downlink traffic rate requirement, wherein $N \geq 1$;
    determining target downlink transmitting power of each of the bearing carriers based on the reception quality information, the determined bearing carriers, the determined number of the bearing carriers and the reception strength information; and
    determining to transmit the downlink data of the first terminal on an i-th bearing carrier using the determined target downlink transmitting power if a total downlink transmitting power of the i-th bearing carrier is less than or equal to a first preset threshold.

2. The method according to claim 1, wherein the process of determining target downlink transmitting power of each of the bearing carriers based on the reception quality information, the determined bearing carriers, the determined number of the bearing carriers and the reception strength information comprises:
    determining a modulation coding scheme allowed for the downlink data of the first terminal based on the reception quality information;
    determining the number and positions of resource blocks on each of the bearing carriers based on the determined bearing carriers, the determined number of the bearing carriers and the determined modulation coding scheme;
    determining the target downlink transmitting power of each of the bearing carriers based on the reception strength information, the determined modulation coding scheme and the determined number of the resource blocks.

3. The method according to claim 2, wherein the process of determining target downlink transmitting power of each of the bearing carriers based on the reception strength information, the determined modulation coding scheme and the determined number of the resource blocks comprises:
    determining a maximum coupling loss between the serving base station and the first terminal based on the transmitting power information in the serving base station and the reception strength information in the traffic request, wherein the transmitting power information includes one or more of the transmitting power of the primary synchronization signal, the transmitting power of the secondary synchronization signal and the transmitting power of the reference signal in the serving base station;
    determining a minimum received power requirement of the resource blocks on each of the bearing carriers based on the determined modulation coding scheme and the determined number of the resource blocks; and
    determining the target downlink transmitting power of each of the bearing carriers based on the maximum coupling loss and the minimum received power requirement.

4. The method according to claim 1, wherein the method further comprises:
    determining to boost the available downlink transmitting power of the i-th bearing carrier if the total downlink transmitting power of the i-th bearing carrier is higher than the first preset threshold and a current total downlink transmitting power of the serving base station is less than or equal to a second preset threshold, so that the downlink data of the first terminal is transmitted on the i-th bearing carrier using the determined target downlink transmitting power.

5. The method according to claim 4, wherein the method further comprises:

determining to boost the available downlink transmitting power of the i-th bearing carrier if the total downlink transmitting power of the i-th bearing carrier is higher than the first preset threshold, the current total downlink transmitting power of the serving base station is higher than the second preset threshold and there is a terminal whose traffic priority is lower than that of the first terminal in the terminals served by the serving base station, so that the downlink data of the first terminal is transmitted on the i-th bearing carrier using the determined target downlink transmitting power.

6. The method according to claim 5, wherein the method further comprises:

determining to drop the downlink transmitting power of a terminal whose traffic priority is lower than that of the first terminal or to not schedule the downlink data of the terminal whose traffic priority is lower than that of the first terminal at the current scheduling time.

7. The method according to claim 5, wherein the method further comprises:

sending a traffic request rejection message if the total downlink transmitting power of the i-th bearing carrier is higher than the first preset threshold, the current total downlink transmitting power of the serving base station is higher than the second preset threshold and there are no terminals whose traffic priority is lower than that of the first terminal in the terminals served by the serving base station.

8. The method according to claim 1, wherein the candidate carriers information comprises single-carrier bearing maximum supportable downlink transmitting rate and current load information.

9. The method according to claim 1, wherein the number of the bearing carriers N is the minimum number in the number of the bearing carriers capable of satisfying the downlink traffic rate requirement.

\* \* \* \* \*